United States Patent Office 3,351,454
Patented Nov. 7, 1967

3,351,454
SILICOFLUORIDE INHIBITION OF CALCIUM NITRATE FORMATION IN NITROCHALK PRODUCTION
Sydney Atkin, Springfield, N.J., assignor to Chemical Construction Corporation, New York, N.Y., a corporation of Delaware
No Drawing. Filed Sept. 4, 1964, Ser. No. 394,599
5 Claims. (Cl. 71—59)

ABSTRACT OF THE DISCLOSURE

The formation of calcium nitrate during the production of nitrochalk by the mixing of molten ammonium nitrate with powdered limestone is prevented, by adding a small amount of sodium silicofluoride, potassium silicofluoride or ammonium silicofluoride to the molten fluid mixture prior to cooling, which produces a solid nitrochalk product which is essentially free of calcium nitrate and is non-hygropscopic.

---

The present invention relates to the production of nitrochalk, which is a fertilizer product obtained by mixing molten ammonium nitrate with powdered solid calcium carbonate, and solidifying the resulting fluid mixture into solid discrete particles. It has been determined that an improved nitrochalk product may be obtained, which is substantially free of calcium nitrate, by adding a small amount of a silicofluoride compound such as ammonium silicofluoride, sodium silicofluoride or potassium silicofluoride to the fluid mixture prior to solidification.

The production of nitrochalk by mixing molten ammonium nitrate with calcium carbonate particles, and solidifying the resultant fluid mixture into discrete particles such as prills, is a well-known commercial procedure. One of the principal problems encountered in this process involves the formation of calcium nitrate due to chemical reaction when the components are mixed. The presence of this compound in the finished solid product is highly undesirable, since calcium nitrate is highly deliquescent. Thus, nitrochalk which contains a substantial proportion of calcium nitrate has a tendency to absorb moisture and form a sticky or gummy mass during storage.

One approach to the prevention of calcium nitrate formation in nitrochalk is described in U.S. Patent No. 3,049,420. According to this procedure, the ammonium nitrate which is mixed with the calcium carbonate contains more than 10% water. Thus, a mixing temperature below 120° C. may be employed. At this relatively low temperature, reaction between ammonium nitrate and calcium carbonate does not occur, and consequently the formation of calcium nitrate during mixing is essentially prevented. The aqueous mixture is then passed through a falling film evaporator for water removal, and the resulting substantially anhydrous melt is passed to a prilling tower. The melt is dispersed into a counter-current stream of cooling air in accordance with established practice, to form a solid prilled product.

The addition of additives to the fluid nitrochalk mixture has also been suggested, especially to prevent decomposition and nitrogen loss. Thus, U.S. Patent No. 2,912,318 describes a procedure for the production of nitrochalk in which one of the compounds ammonium monohydrogen phosphate and potassium monohydrogen phosphate is added to the fluid mixture prior to solidification, in amounts ranging from about 1% to 3%. These additives serve to reduce nitrogen loss from the final product.

It has now been determined that a substantially improved solid nitrochalk product, having a substantially reduced and negligible content of calcium nitrate, may be produced by adding a small but effective amount of silicofluoride compound such as ammonium silicofluoride, sodium silicofluoride or potassium silicofluoride to the fluid mixture prior to solidification. The silicofluoride compound is preferably added to the fluid mixture in amounts ranging up to about 1% by weight, although a smaller amount of about 0.1% by weight or less may also be effective in suppressing the formation of calcium nitrate, depending on individual circumstances and conditions. The silicofluoride compound is preferably added to the molten ammonium nitrate prior to mixture with the powdered calcium carbonate, although the silicofluoride compound may alternatively be added to the powdered calcium carbonate before mixing, or even to the fluid mixture itself. It has been determined that this addition of silicofluoride compound is highly advantageous in suppressing the formation of calcium nitrate in the nitrochalk mixture, and thus a solid nitrochalk product is produced having a negligible content of calcium nitrate. Thus, the solid nitrochalk product produced according to the present invention, when formed into solid discrete particles by such procedure as prilling the fluid mixture by dispersion in air or comminuting a solid mass of material, is free-flowing and substantially non-hygroscopic.

It is an object of the present invention to produce an improved form of nitrochalk.

Another object is to produce nitrochalk with reduced and negligible calcium nitrate content.

A further object is to produce a nitrochalk which is highly resistant to caking.

An additional object is to provide a more effective additive for the suppression of calcium nitrate formation in fluid nitrochalk.

These and other objects and advantages of the present invention will become evident from the data and test results which follow. Referring to Table I infra, in each test 180 grams of anhydrous ammonium nitrate was melted and the additive was added to the molten ammonium nitrate. The molten ammonium nitrate was maintained at a temperature of about 180° C., although any temperature in the range of 180° C. to 210° C. is suitable. At temperatures above 210° C., the ammonium nitrate tends to decompose. The molten ammonium nitrate in each case was then mixed with 120 grams of powdered dolomitic limestone, which analyzed 30.8% CaO and 21.8% MgO. The limestone was preheated to 160° C., which is a preferable minimum preheat temperature prior to mixing of the components. Preheating of the limestone serves to assure the prevention of premature solidification of the nitrochalk during mixing. The resulting slurry was kept at a temperature of 180° C. for 30 minutes, and continuously mixed to attain a homogeneous mixture. Then samples were taken and poured onto a porcelain plate for rapid cooling to a temperature below 170° C., the melting point of pure ammonium nitrate. The solidified samples were ground and analyzed for calcium nitrate and magnesium nitrate content. Following are the test results.

TABLE I.—EFFECT OF ADDITIVES ON NITROCHALK

| Test No. | Additive | Concentration in Nitrochalk, Percent by weight | Nitrochalk Analysis | |
|---|---|---|---|---|
| | | | Percent Calcium Nitrate | Percent Magnesium Nitrate |
| 1 | None | 0 | 0.64 | 0.34 |
| 2 | Ammonium Silicofluoride | 0.2 | 0.08 | 0.15 |
| 3 | Potassium Silicofluoride | 0.2 | 0.05 | 0.12 |
| 4 | Sodium Silicofluoride | 0.2 | 0.04 | 0.10 |
| 5 | do | 0.5 | 0.02 | 0.06 |
| 6 | Potassium Sulfate | 0.5 | 0.04 | 0.18 |

It is evident from the test results supra that substantial reduction in calcium nitrate formation is attained by the use of silicofluoride additives of the present invention, as compared to Test No. 1 in which no additive was present. In addition, a comparison of the results of Tests Nos. 5 and 6 indicates that the additives of the present invention are substantially more effective in suppressing calcium nitrate formation than potasium sulfate, which is an additive which has been previously employed for this purpose. This conclusion is also borne out by a comparison of Tests Nos. 4 and 6, from which it is evident that less than half the concentration of sodium silicofluoride as compared to potassium sulfate was equally as effective in reducing calcium nitrate formation.

I claim:

1. In the method for producing nitrochalk which comprises mixing molten ammonium nitrate with powdered limestone, and cooling the resulting fluid mixture to produce solid product nitrochalk, the improvement which comprises adding a small but effective amount of a silicofluoride compound selected from the group consisting of sodium silicofluoride, potassium silicofluoride and ammonium silicofluoride to said fluid mixture, whereby the formation of calcium nitrate in said solid nitrochalk is effectively suppressed.

2. In the method for producing nitrochalk which comprises mixing molten ammonium nitrate with powdered limestone, and dispersing the resulting fluid mixture in air whereby said fluid mixture is cooled and solid discrete particles of product nitrochalk are produced, the improvement which comprises incorporating up to about 1% by weight of a silicofluoride compound selected from the group consisting of sodium silicofluoride, potassium silicofluoride and ammonium silicofluoride in said fluid mixture, whereby the formation of calcium nitrate in said product nitrochalk is effectively suppressed.

3. Method of claim 2, in which said silicofluoride compound is incorporated in said fluid mixture by adding said silicofluoride compound to said molten ammonium nitrate, prior to mixing said molten ammonium nitrate with said powdered limestone.

4. A method for the production of nitrochalk with reduced calcium nitrate content which comprises heating powdered limestone to a temperature of at least 160° C., mixing molten ammonium nitrate at a temperature in the range of 180° C. to 210° C. with said heated limestone, whereby a fluid mixture is formed, adding between about 0.1% to 1.0% by weight of a silicofluoride compound selected from the group consisting of sodium silicofluoride, potassium silicofluoride and ammonium silicofluoride to said fluid mixture, and cooling said fluid mixture to a temperature below 170° C. whereby solid nitrochalk is produced with reduced calcium nitrate content.

5. Method of claim 4, in which said silicofluoride compound is added to said fluid mixture by mixing said silicofluoride compound with said molten ammonium nitrate, prior to mixing said molten ammonium nitrate with said powdered limestone.

References Cited

UNITED STATES PATENTS

| | | | |
|---|---|---|---|
| 2,079,324 | 5/1937 | Krauch et al. | 71—60 |
| 2,155,372 | 4/1939 | Beekhuis | 71—60 |
| 3,049,420 | 8/1962 | Weiland | 71—60 |

OTHER REFERENCES

| | | |
|---|---|---|
| 963,605 | 5/1957 | Germany. |
| 941,275 | 11/1963 | Great Britain. |

DONALL H. SYLVESTER, *Primary Examiner.*

T. D. KILEY, *Assistant Examiner.*